United States Patent [19]

Takeuchi et al.

[11] Patent Number: 5,088,583
[45] Date of Patent: Feb. 18, 1992

[54] CLUTCH COVER ASSEMBLY WITH SPRING BIASED RELEASE ASSEMBLY

[75] Inventors: Hiroshi Takeuchi; Masahiko Iwase; Hiromi Tojima; Ikuo Murata; Norihisa Uenohara, all of Neyagawa, Japan

[73] Assignee: Kabushiki Kaisha Daikin Seisakusho, Osaka, Japan

[21] Appl. No.: 513,459

[22] Filed: Apr. 23, 1990

[30] Foreign Application Priority Data

Apr. 27, 1989 [JP] Japan ................. 1-50619[U]
Jul. 14, 1989 [JP] Japan ................. 1-83344[U]

[51] Int. Cl.$^5$ .............................. F16D 13/50
[52] U.S. Cl. ..................... 192/70.27; 192/89 B
[58] Field of Search .......... 192/70.27, 89 B, 109 A, 192/109 B

[56] References Cited

U.S. PATENT DOCUMENTS

| 3,323,624 | 6/1967 | Maurice | 192/89 B |
| 4,602,708 | 7/1986 | Nagano | 192/70.27 |
| 4,618,047 | 10/1986 | Kinz | 192/89 B |
| 4,641,736 | 2/1987 | Forster | 192/89 B |
| 4,844,226 | 7/1989 | Taketani | 192/89 B X |
| 4,949,829 | 8/1990 | Tojima et al. | 192/89 B |

FOREIGN PATENT DOCUMENTS

| 0106129 | 5/1987 | Japan | 192/89 B |
| 943039 | 11/1963 | United Kingdom | 192/89 B |
| WO89-01096 | 2/1989 | World Int. Prop. O. | 192/89 B |

Primary Examiner—Rodney H. Bonck
Attorney, Agent, or Firm—Armstrong, Nikaido, Marmelstein, Kubovcik & Murray

[57] ABSTRACT

A clutch disc assembly holding a diaphragm spring using a pair of wire rings clamped by bent tabs of a clutch cover or stud pins, and having a coned disc spring for controlling an increase in a releasing load due to wear of facings of a clutch. An annular coned disc spring urging an outer peripheral portion of the diaphragm spring to a side opposite to the clutch disc is disposed between a pressure plate and the diaphragm spring. An annular support plate is provided and its inner peripheral portion is held between the bent tabs of the clutch cover and the pair of wire rings. The coned disc spring is held by an outer peripheral portion of the support plate and the outer peripheral portion of the diaphragm spring in an elastically deflected condition.

13 Claims, 4 Drawing Sheets

CLUTCH COVER ASSEMBLY WITH SPRING BIASED RELEASE ASSEMBLY

BACKGROUND ART

1. Industrial useful field

This invention relates to a clutch cover assembly equipped with a coned disc spring for controlling an increase in a releasing load due to wear of the facings of a clutch disc.

2. Prior art and its problem

Figure 12:
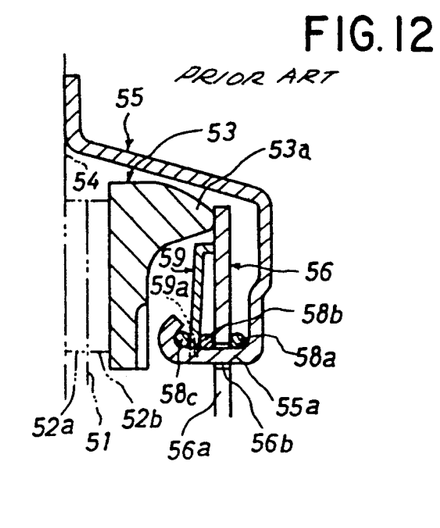
FIG. 12 is a vertical sectional view of an essential part showing a conventional clutch cover assembly.

FIG. 12 shows a conventional clutch cover assembly (Japanese Unexamined Utility Model Publication No. 64-24732), in which a diaphragm spring is held by a pair of wire rings secured to bent tabs of a clutch cover and equipped with a coned disc spring for controlling an increase in releasing load due to wear of facings of a clutch disc. In this clutch cover assembly, facings 52a and 52b are provided on both outer peripheral surfaces of a clutch disc 51, and the facing 52a is pressed on a flywheel 54 by a pressure plate 53. An outer peripheral part of the pressure plate 53 is covered by a clutch cover 55. An annular diaphragm spring 56 is disposed between the clutch cover 55 and the pressure plate 53. Approximately L-shaped bent tabs 55a protrude integrally from an inner peripheral edge of the clutch cover 55 with appropriate spaces in circumferential direction left therebetween. Bent tabs 55a pass through enlarged openings 56b formed on ends of slits 56a of the diaphragm spring 56. The bent tabs 56a support inner peripheries of three wire rings 58a, 58b and 58c. The diaphragm spring 56, at its radial intermediate part, is held by wire rings 58a and 58b. The diaphragm spring 56 is pressed on a fulcrum land 53a on a backside of pressure plate 53 at its outer peripheral part and contacts with a release bearing (not shown) of a releasing means at its inner peripheral part. A coned disc spring 59 is disposed between the diaphragm spring 56 and the pressure plate 53 and is held by the wire rings 58b and 58c at its inner peripheral part. An outer peripheral edge of the coned disc spring 59 is bent to contact, at its top end, with the diaphragm spring 56. Plural concave portions 59a fitting onto the bent tabs 55a are formed on an inner peripheral edge of the coned disc spring 59 with appropriate spaces, in circumferential direction left therebetween.

Generally, the diaphragm spring 56 has such a characteristic that its deflection load increases when its deflection decreases from some value to a specified value and the deflection load decreases when the deflection further decreases. For this reason, when the facings 52a and 52b are worn out at time of clutch engagement, a deflection load of the diaphragm spring 56 increases with a decrease in a deflection of the diaphragm spring 56. Consequently, a pressing force exerted from the diaphragm spring 56 on the pressure plate 53 increases so that a required treading force of clutch pedal also increases. Therefore, the annular coned disc spring 59 is installed between the diaphragm spring 56 and the pressure plate 53 so as to offset the increase in deflection load of the diaphragm spring 59 by means of the deflection load of the coned disc spring 59.

Accordingly, even when the facings 52a and 52b are worn out to cause the deflection load of the diaphragm spring 56 to increase at time of clutch engagement, the deflection load of the coned disc spring 59 is thereby increased to urge the outer peripheral part of the diaphragm spring 56 toward the clutch cover 55, so that the increase in the pressing force exerted from the diaphragm spring 56 on the pressure plate 53 is controlled.

In the above-mentioned conventional clutch cover assembly, however, its assembly work was very laborious because the three wire rings 58a, 58b and 58c had to be contacted with the bent tabs 55a at their outsides, and moreover had to be installed so as to hold the diaphragm spring 56 and the coned disc spring 59 from both sides. Further, because the three wire rings 58a, 58b and 58c were put side by side in the axial direction, it was difficult to shorten the axial length of the clutch cover assembly.

Figure 13:
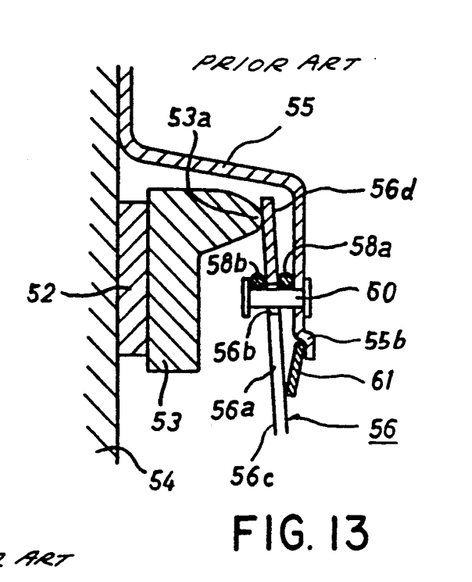
FIG. 13 is a vertical sectional view of an essential part showing another conventional clutch cover assembly.

FIG. 13 is a vertical sectional partial view showing another conventional clutch cover assembly equipped with a coned disc spring. In this figure, symbols the same as those of FIG. 12 represent the same or equivalent parts. 60 is a stud pin which is installed at plural places of clutch radial inner peripheral part of the clutch cover 55 with spaces left therebetween in circumferential direction. The stud pin 60 is so installed as to protrude in axial direction toward the pressure plate side through the enlarged opening 56b formed at the clutch radial outer peripheral end of the slit 56a of the diaphragm spring 56. Inner peripheries of the two wire rings 58a and 58b are supported by the stud pins 60. 61 is an annular coned disc spring. The coned disc spring 61 is installed so that its radially outer peripheral edge makes contact, from the diaphragm spring side, with a stepped part 55b of the clutch cover 55 located at a position radially inwardly than the stud pin 60 and is secured thereto by a clip (not shown) etc. The radially inner peripheral edge of the coned disc spring 61 makes contact with diaphragm spring 56.

According to this structure, even when a facing 52 is worn out to cause the deflection load of the diaphragm spring 56 to increase at time of clutch engagement, the deflection load of the coned disc spring 61 is thereby increased to urge an inner peripheral part 56c of the diaphragm spring 56 toward the pressure plate in axial direction, so that its outer peripheral part 56d is urged toward the clutch cover in axial direction. Consequently, the increase in pressing force exerted from the diaphragm spring 56 onto the pressure plate 53 is controlled.

Figure 14:
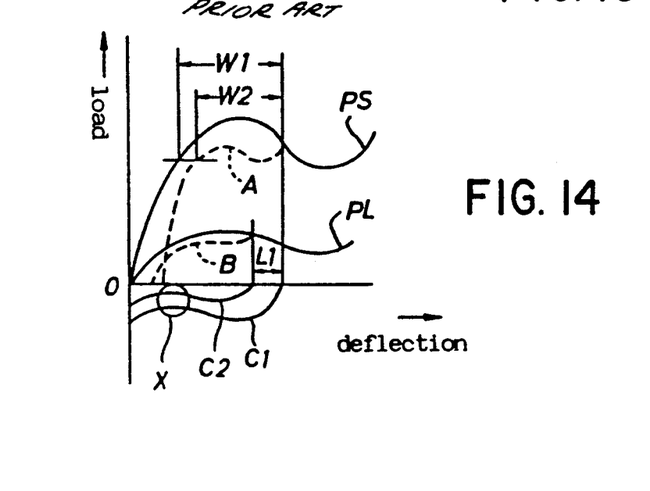
FIG. 14 a diagram showing deflection/load characteristics of a diaphragm spring and the coned disc spring for use in the conventional clutch cover assembly of FIG. 13.

FIG. 14 shows deflection/load characteristics of the diaphragm spring 56 and the coned disc spring 61 of the embodiment of FIG. 13. An arrow in parallel with an axis of abscissa indicates an increasing direction of deflection of the diaphragm spring 56 and a decreasing direction of deflection of the coned disc spring 61, respectively. PS represents a pressing load characteristic of the diaphragm spring 56 on the pressure plate 53, and PL represents a characteristic of load required when releasing the diaphragm spring 56 by a release bearing mechanism i.e. a releasing load characteristic. C1 and C2 represent load characteristics of the coned disc spring 61. As described above, the increase in pressing load of the diaphragm spring 56 on the pressure plate 53 is offset by the deflection load of the coned disc spring 61. Namely, PS is offset by C1 to be changed to a curve as shown by a broken line A.

Paying attention to the releasing load characteristic PL, however, when releasing the diaphragm spring 56 by pushing its inner peripheral edge toward the flywheel in an axial direction, a clearance is produced between the inner peripheral part 56c and the inner peripheral edge of the coned disc spring 61 due to the deflection of the inner peripheral part 56c of the diaphragm spring 56. Thus, the coned disc spring 61 works later than PS by a time corresponding to L1, FIG. 14. Namely, PL is offset by C2, changed to a curve as shown by a broken line B. Accordingly, this structure included such disadvantage that the effect of decreasing the releasing load i.e. the required treading force of clutch pedal was minimized. Further, in the clutch cover assembly having the foregoing structure, the coned disc spring 61, having a deflection/load characteristic in which the deflection load does not become zero even after it increases and then decreases, is used in order to avoid a phenomenon where the coned disc spring 61 springs back, due to excessive deflection, and does not operate thereafter. That is, the load does not become zero at a portion X as shown by C1 and C2, FIG. 14, in the coned disc spring 61 For this reason, a wear allowance (W1 in the figure) when using the coned disc 61 became smaller than a wear allowance (W2 in the figure) when not using the coned disc spring 61, shortening the service life of the clutch.

SUMMARY OF THE INVENTION

An object of this invention is to provide a clutch cover assembly which is simple in its assembling work and can be shortened in its axial length.

This invention provides a clutch cover assembly, in which an annular coned disc spring urging an outer peripheral part of a diaphragm spring toward a side opposite to a clutch disc, is installed between a pressure plate and the diaphragm spring, an annular support plate an inner peripheral part of which is held between bent tabs of a clutch cover and a pair of wire rings is installed, and the coned disc spring is held by an outer peripheral part of this support plate and the outer peripheral part of the diaphragm spring in an elastically deflected condition.

DETAILED DESCRIPTION OF THE INVENTION

FIRST EMBODIMENT

Figure 1:
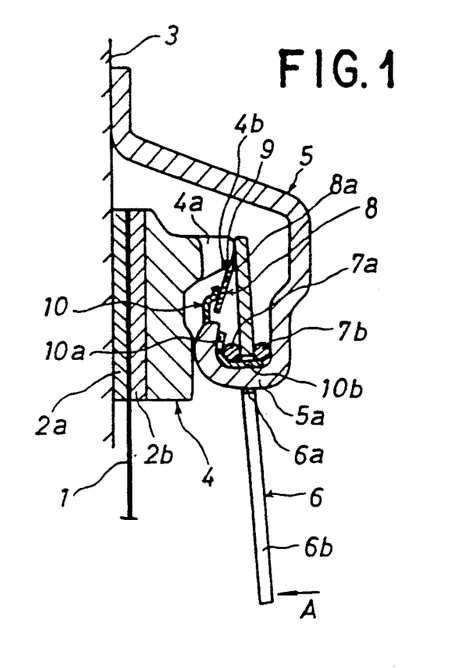
FIG. 1 is a vertical sectional view of an essential part showing a clutch cover assembly of a first embodiment of the invention.

FIG. 1 is the vertical sectional view of the essential part showing the clutch cover assembly of the first embodiment of this invention. Annular facings 2a and 2b are secured to both surfaces of an outer peripheral part of an annular clutch disc 1. One facing 2a contacts with a flywheel 3 and the other facing 2b contacts with an outer peripheral part of an annular pressure plate 4. The outer peripheral part of the annular pressure plate 4 is covered by a clutch cover 5 with an appropriate space left therebetween. The pressure plate 4 is supported by a not-shown leaf spring to the clutch cover 5 in such a manner that it can not rotate relatively to the clutch cover 5 but can move in axial direction within a specified distance relatively thereto. An outer peripheral part of the clutch cover 5 is secured to the flywheel 3 by plural bolts (not shown). At its inner peripheral end, clutch cover 5 is provided with approximately L-shaped bent tabs 5a, which project to the clutch disc 1 side of clutch cover 5 in axial direction. The tip ends of tabs 5a are bent radially outwardly and are integrally formed, with spaces left therebetween, in the circumferential direction of the clutch. An annular diaphragm spring 6, urging the pressure plate 4 to the clutch disc 1 side, is disposed between the pressure plate 4 and the clutch cover 5. An outer peripheral edge of the diaphragm spring 6 contacts with a fulcrum land 4a of the pressure plate 4. Plural rectangular holes 6a are made on the diaphragm spring 6 at radial intermediate parts with appropriate spaces left therebetween in circumferential direction of the clutch. Plural slits 6b extend radially from an inner peripheral edge of the diaphragm spring 6 to the rectangular edge of the diaphragm spring 6 to the rectangular holes 6a. The bent tabs 5a of the clutch cover 5 pass through the rectangular holes 6a of the diaphragm spring 6. The radial intermediate part of the diaphragm spring 6 is held by a pair of wire rings 7a and 7b, the inner peripheries of which are supported by the bent tabs 5a. An annular coned disc spring 8, urging the outer peripheral part of the diaphragm spring 6 to a side opposite to the clutch disc is disposed between the outer peripheral part of the pressure plate 4 and the outer peripheral part of the diaphragm spring 6. An outer peripheral edge of the coned disc spring 8 is inserted in a clearance between a stepped part 4b of the fulcrum land 4a of the pressure plate 4 and the diaphragm spring 6. Plural slits 8a extending in radial directions are formed on an outer peripheral part of the coned disc spring 8 with appropriate spaces left therebetween in circumferential direction. An annular wave wire 9 is installed in the stepped part 4b of the fulcrum land 4a of the pressure plate 4. The wave wire 9 has a wave-like shape which is alternatively convex and concave in axial direction, and wave tops fit in the slits 8a of the coned disc spring 8. The wave wire 9 engages the outer peripheral edge of the coned disc spring 8 on the diaphragm spring 6. An annular support plate 10 is disposed between the outer peripheral part of the pressure plate 4 and the outer peripheral part of the diaphragm spring 6. An outer peripheral part of the support plate 10 contacts with an inner peripheral part of the coned disc spring 8 at the clutch disc 1 side of spring 8. The support plate 10 has a radial cross section of approximately L-shape. Plural relief holes 10a are formed on plate 10 with appropriate spaces left therebetween, in circumferential direction, for the ends of bent tabs 5a of the clutch cover 5 which pass through the relief holes 10a. Plural tongue-like pieces 10b, passing through the rectangular holes 6a of the diaphragm spring 6, are formed on an inner peripheral part of the support plate 10 with appropriate spaces left therebetween, in circumferential direction. The tongue-like pieces 10b are held by a pair of wire rings 7a and 7b and the bent tabs 5a of the clutch cover 5. FIG. 1 shows an engaged state of the clutch, in which the pressure plate 4 presses the facing 2a of the clutch disc 1, on the flywheel 3, with a help of an urging force of the diaphragm spring 6. The coned disc spring 8 is held by the diaphragm spring 6 and the support plate 10 in an elastically deflected condition, so that it urges the outer peripheral part of the diaphragm spring 6 toward the clutch cover 5 side i.e. to a side opposite to the clutch disc 1.

The operation will be described hereunder. When the inner peripheral part of the diaphragm spring 6 is displaced in a direction of arrow A, FIG. 1, by a pressing force of a releasing device in response to treading operation of clutch pedal, the outer peripheral edge of the diaphragm spring 6 is displaced in a direction opposite to the clutch disc 1 around the wire rings 7a and 7b so as to release the urging force of the pressure plate 4 and disengage the clutch. When the clutch pedal is released, the pressing force on the releasing device is also released and the clutch engaged state is restored.

According to the clutch cover assembly of this embodiment, the support plate 10 is held by the pair of wire rings 7a and 7b and the bent tabs 5a of the clutch cover 5. The coned disc spring 8 is held by the support plate 10 and the diaphragm spring 6 in the elastically deflected condition. The assembly work becomes simple and the clutch axial length can be shortened because it is not necessary to install three wire rings in the assembly, as in the case of the conventional arrangement of FIG. 12. Further, when the plural slits 8a are formed on the outer peripheral part of the coned disc spring 8 in radial directions and the wave wire 9 is installed in the stepped part 4b of the fulcrum land 4a so as to fit wave tops of the wave wire 9 in the slits 8a as described in this embodiment, positioning, chattering at time of releasing and locking in rotating direction of the coned disc spring 8 can be securely accomplished. Therefore, wear and abnormal sound of the coned disc spring 8 can be successfully avoided and, at the same time, abrasion powder can be discharged from the slits 8a. The wave wire 9 may be omitted. In such a case it is preferable to fit the outer peripheral edge of the coned disc spring 8 in the stepped part 4b of the fulcrum land 4a or to support the coned disc spring 8 skillfully by making the inner peripheral edge of the coned disc spring 8 mate with the support plate 10.

As described above, the clutch cover assembly can be simplified in its assembly work and can be shortened in its axial length.

SECOND EMBODIMENT

Figure 2:
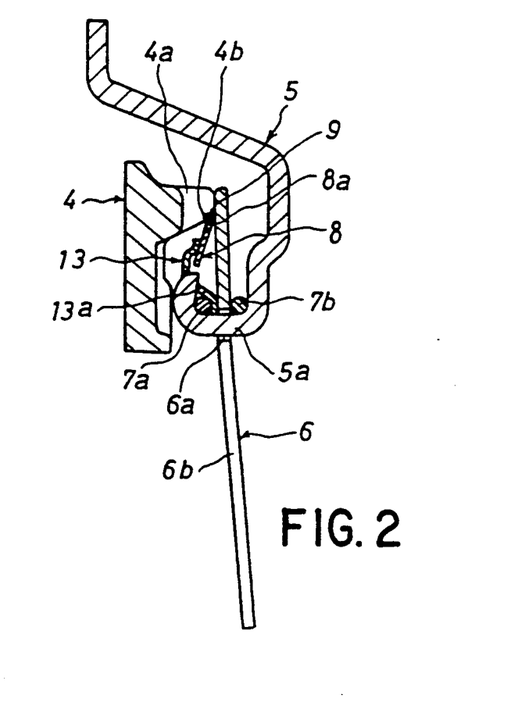
FIG. 2 is a vertical sectional view of an essential part showing a clutch cover assembly of a second embodiment.

FIG. 2 shows the second embodiment and, as illustrated in this figure, an inner peripheral part of an annular support plate 13 on which relief holes 13a are made with appropriate spaces left therebetween in circumferential direction, may be held by the diaphragm spring 6 and the clutch disc 1 side wire ring 7a, of the pair of wire rings 7a and 7b. The ends of bent tabs 5a pass through the relief holes 13a in support plate 13. Clutch disc 1 and facings 2a and 2b and the flywheel 3 are omitted from FIG. 2, and the FIGS. which follow in order for easy in understanding of the figures. According to the second embodiment, the axial length of the clutch assembly can be shortened and the assembly work can be simplified in the same manner as the embodiment of FIG. 1. Further, because the support plate 10 is not installed between the wire rings 7a and 7b and the bent tabs 5a, as in case of embodiment of FIG. 1, it is not necessary to enlarge the radial dimension of the clutch cover 5 by a thickness corresponding to that of the support plate 10 so that a clutch cover 5, the same as a conventional cover, can be used.

The second embodiment also enables the easy assembly work and shortening of axial length. Especially, in installed the annular support plate 13, the inner peripheral part is held between the diaphragm spring 6 and the clutch disc 1 side wire ring 7a among the pair of wire rings 7a and 7b. The coned disc spring 8 is held by the outer peripheral part of the support plate 13 and the diaphragm spring 6 in its elastically deflected condition. Therefore, the assembly work is further simplified. At the same time, it is not necessary to enlarge the radial dimension of the clutch cover 5 by the thickness corresponding to that of the support plate 10 so that the clutch cover 5, the same as conventional cover, can be used.

THIRD EMBODIMENT

Figure 3:
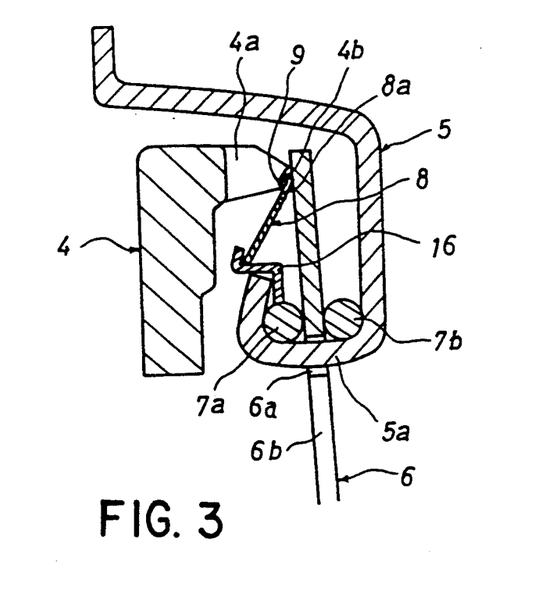
FIG. 3 a vertical sectional view of an essential part showing a clutch cover assembly of a third embodiment.
Figure 4:
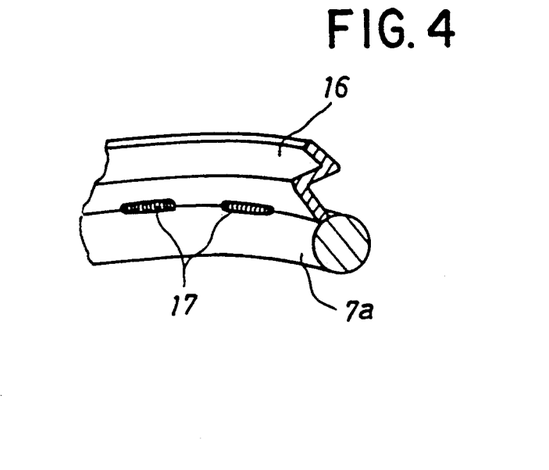
FIG. 4 is an external oblique view showing a welding state of a wire ring with a support plate.

FIG. 3 shows the third embodiment. As illustrated in FIG. 3, an inner peripheral edge of an annular support plate 16 is secured, by welding 17, FIG. 4, to the clutch disc 1 side of wire ring 7a among the pair of wire rings 7a and 7b. Thus, the wire ring 7a is butted to the inner peripheral edge of the annular support plate 16 and the welding 17, such as, electro-beam welding or laser welding etc., is carried out with appropriate spaces left therebetween in circumferential direction as illustrated in FIG. 4, securing the support plate 16 to the wire ring 7a. The same effect as that of the embodiment of FIG. 1 can be accomplished by this structure. Because the support plate 10 or the support plate 13 is not installed between the wire rings 7a and 7b and the bent tabs 5a, or between the wire ring 7a and the diaphragm spring 6, the clutch cover 5, the same as the conventional clutch cover, can be used and a crimping jig, for crimping the bent tabs 5a, the same as a conventional jig can be utilized. Further, the support plate 16 is firmly secured.

The third embodiment also enables easy assembly work and shortening of axial length. Especially, there is installed the annular support plate 16, the inner peripheral part of which is secured, by welding, to the clutch disc 1 side of wire ring 7a among the pair of wire rings 7a and 7b. The coned disc spring 8 is held by the outer peripheral part of the support plate 16 and diaphragm spring 6 in the elastically deflected condition. Therefore, because the support is not installed between the pair of the wire rings 7a and 7b and the bent tabs 5a, or between the wire ring 7a and the diaphragm spring 6, the clutch cover 5, the same as the conventional clutch cover can be used and a crimping jig for crimping the bent tabs 5a, the same as the conventional jig, can be utilized. Further, the support plate 16 can be secured firmly.

FOURTH EMBODIMENT

Figure 5:
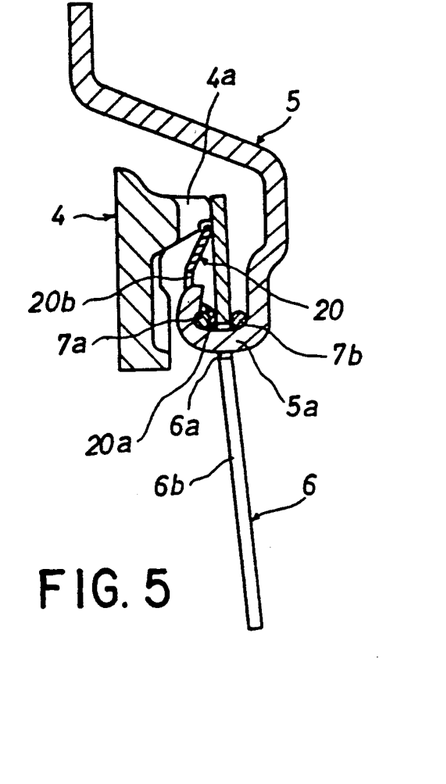
FIG. 5 is a vertical sectional view of an essential part showing a clutch cover assembly of a fourth embodiment.

FIG. 5 shows the fourth embodiment. As illustrated in this figure, an annular supporting part 20a is integrally extended from an inner peripheral edge of a coned disc spring 20. Plural relief holes 20b are made on the supporting part 20a, with appropriate spaces left therebetween in circumferential direction, and the bent tabs 5a are fitted in the relief holes 20b; so that an inner peripheral edge of the supporting part 20a may be held by the diaphragm spring 6 and the clutch disc 1 side wire ring 7a among the pair of the wire rings 7a and 7b. The axial length of the clutch assembly can be shortened by this structure in the same manner as the embodiment of FIG. 1, and the assembly work can be further simplified because the support plate is integrated with the coned disc spring 20. The bent tabs 5a are fitted in the relief holes 20b so that the coned disc spring 20 can be securely locked in rotating direction.

The fourth embodiment also enables easy assembly and shortening of axial length. Especially, the annular supporting part 20a is integrally extended from the inner peripheral edge of the coned disc spring 20 in radial inward direction, and the inner peripheral edge of the supporting part 20a is held by the diaphragm spring 6 and the clutch disc 1 side wire ring 7a among the pair of the wire rings 7a and 7b; so that the coned disc spring 20 can be held in the elastically deflected condition. Therefore, the support plate can be integrated with the coned disc spring and the assembly work can further be simplified.

FIFTH EMBODIMENT

Figure 6:
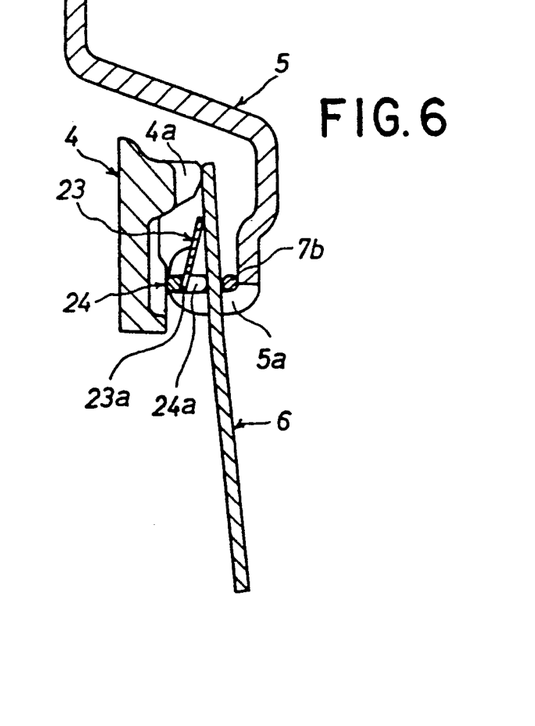
FIG. 6 is a vertical sectional view of an essential part showing a clutch cover assembly of a fifth embodiment.
Figure 7:
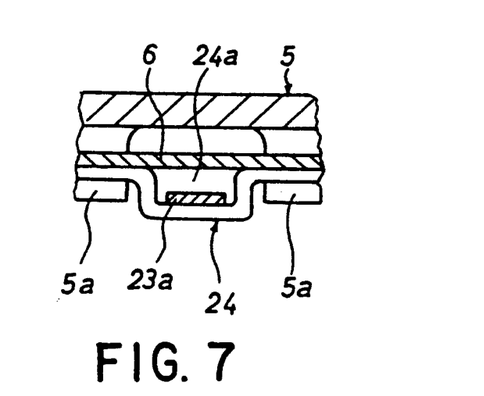
FIG. 7 is an enlarged cross sectional view of an essential part of the fifth embodiment.

FIG. 6 shows the fifth embodiment. As illustrated in this figure, plural tongue-like pieces 23a are extended from an inner peripheral edge of a coned disc spring 23 with appropriate spaces, in circumferential direction, left therebetween. Clutch disc 1 side wire rings 24 are bent toward the clutch disc 1 and disposed with appropriate spaces, in circumferential direction, left therebetween. Plural concave portions 24e are formed between the adjoining bent tabs 5a as illustrated in FIG. 7. The coned disc spring 23 may be supported by inserting the tongue-like pieces 23a in the concave portions 24a. In this structure, reduction in manufacturing cost owing to lessening of quantity of component can be accomplished and the assembly work can further be simplified because the support plate can be eliminated. Moreover, the coned disc spring 23 can be locked securely in rotating direction because the tongue-like pieces 23a are fitted in the concave portions 24a.

The fifth embodiment also enables easy assembly and shortening of axial clutch assembly length. Especially, the plural tongue-like pieces 23a are extended radially inwardly from the inner peripheral edge of the coned disc spring 23 with appropriate spaces, in circumferential direction, left therebetween. The clutch 1 side wire rings 24, among the pair of wire rings 24 and 7b are bent toward the clutch disc 1 and disposed with appropriate spaces, in circumferential direction, left therebetween to form the plural concave portions 24a. The coned disc spring 23 is supported by inserting the tongue-like pieces 23a in the concave portions 24a in the elastically deflected condition. Therefore, the support plate can be eliminated, the reduction in manufacturing cost owing to the lessening of the number of components can be accomplished, and the assembly work can further be simplified. Moreover, the coned disc spring 23 can be locked securely in rotating direction because the tongue-like pieces 23a are fitted in the concave portions 24a of the wire ring 24.

SIXTH EMBODIMENT

Figure 8:
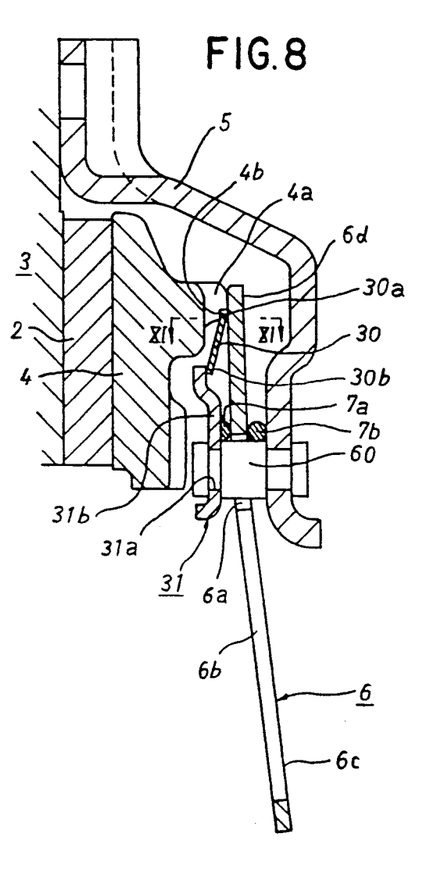
FIG. 8 is a vertical sectional view of an essential part showing a clutch cover assembly of a sixth embodiment.

FIG. 8 is a vertical sectional view of essential part showing the clutch cover assembly of the sixth embodiment. The wire ring 7a has a semi-circular cross section. Annular support plate 31 is secured to stud pins 60 by inserting tip ends of the stud pins 60 in holes 31a made at plural places, in circumferential direction with spaces left therebetween. An outer peripheral edge 31b of the support plate 31 is bent toward the pressure plate 4 side once and then extended outwardly. A coned disc spring 30 is disposed between the diaphragm spring 6 and the pressure plate 4 and support plate 31. A radially outer peripheral edge 30a of the coned disc spring 30 is held between the diaphragm spring 6 and the stepped part 4b formed in circumferential direction at a side inner than a place where the fulcrum land 4a presses on the diaphragm spring 6. A radially inner peripheral edge 30b of the coned disc spring 30 contacts with a tip end of the outer peripheral edge 31b of the support plate 31 from the diaphragm spring 6 side.

Figure 9:
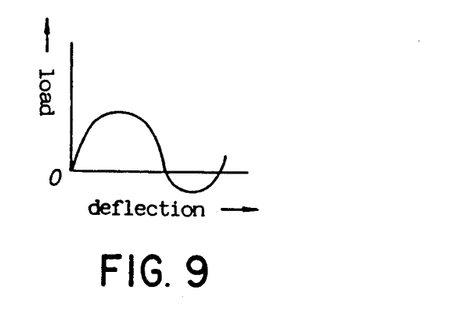
FIG. 9 a diagram showing a deflection/load characteristic of a coned disc spring for use in the sixth embodiment.

The coned disc spring 30 having a deflection/load characteristic, as shown by FIG. 9, is used, in which the load increases from zero, when the deflection increases to a certain value, and it decreases from that value to zero, when the load further increases. In FIG. 9, an arrow parallel with the axis of abscissa indicates deflection increasing direction and that parallel with the axis of ordinate indicates load increasing direction.

Figure 10:
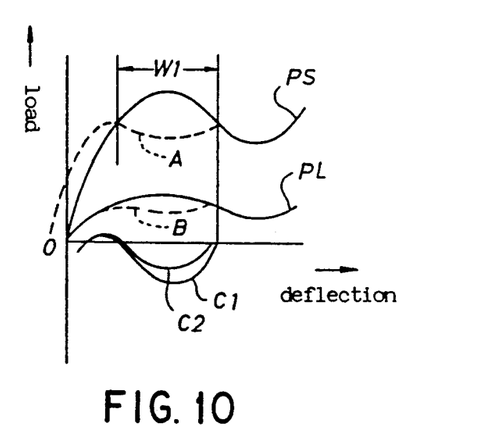
FIG. 10 is a diagram showing deflection/load characteristics of a diaphragm spring and the coned disc spring for use in the sixth embodiment.

In the clutch cover assembly having such structure, when the facings 2 are worn off, an axial position of the pressure plate 4 is shifted toward the flywheel 3 and that of the outer peripheral edge of the diaphragm spring 6 is also shifted in the same direction at the time of clutch engagement. The inner peripheral edge of diaphragm spring 6 is shifted in the opposite direction because the wire rings 7a and 7b form the fulcrum point and the deflection of the diaphragm spring 6 is decreased. On the other hand, the inner peripheral edge 30b of the coned disc spring 30 contacts with the tip end of the outer peripheral edge 31b of the support plate 31 from the diaphragm spring 6 side, so that the coned disc spring 30 is compressed around the inner peripheral edge 30b in the axial direction and deformed into a convex shape toward the diaphragm spring 6 when the outer peripheral edge of the diaphragm 6 moves toward the pressure plate 4. For this reason, an outer peripheral part 6d of the diaphragm spring 6 is urged by the coned disc spring 30 toward the clutch cover side in axial direction, so that the increase in pressing load PS of the diaphragm 6 on the pressure plate 4 is controlled as shown by a broken line A of FIG. 10. FIG. 10 gives the pressing load characteristic PS, the releasing load characteristic PL, and the deflection/load characteristics C1 and C2 of the coned disc spring 30. The coned disc spring 30 does not spring back because it contacts with the diaphragm spring 6 even if deformed into the convex shape. Therefore, even when the coned disc spring 30 having the above characteristics is used, there is no chance for the coned disc spring to become inoperable as encountered in the conventional coned disc spring illustrated in FIG. 13.

Further, since the coned disc spring 30 has the deflection/load characteristic as shown by FIG. 9, the decrease in wear allowance W1 can be avoided when the deflection produced during load change of the coned disc spring 30 from zero to zero is made equal to the wear allowance (WI in FIG. 10) obtained without using the coned disc spring.

Because the coned disc spring 30 is so installed as to urge the outer peripheral part 6d of the diaphragm spring 6, the operational delay of coned disc spring does not occur as encountered in the conventional embodiment of FIG. 13 due to deflection of the inner peripheral part 6c at the time of releasing. Therefore, the increase in releasing load PL is controlled earlier than the conventional case as illustrated in FIG. 10 and the releasing load is reduced by a large margin, i.e. the required treading force of clutch pedal is reduced considerably.

Furthermore, since the outer peripheral edge 30a of the coned disc spring 30 is held by the stepped part 4b of the fulcrum land 4a and the outer peripheral edge of the diaphragm spring 6, the coned disc spring 30 is locked in rotating direction relatively to the pressure plate 4 and the diaphragm spring 6. Consequently, abnormal sound and vibration caused by interference between the coned disc spring 30 and diaphragm spring 6 do not arise during operation of the clutch.

According to the sixth embodiment as described above, the following advantages are obtainable.

(1) The coned disc spring 30 is disposed between the diaphragm spring 6 and the pressure plate 4, the outer peripheral edge 30a is held between the stepped part 4b of the fulcrum land 4a and the outer peripheral edge of the diaphragm spring 6, and the inner peripheral edge 30b is made contact with the tip end of the outer peripheral edge 31b of the support plate 31 secured to the stud pin 60 from the diaphragm spring 6 side; so that the increase in pressing load PS of the diaphragm spring 6 to the pressure plate 4 can be controlled as shown by the broken line A of FIG. 10.

(2) Since the coned disc spring 30 is so installed as to urge the outer peripheral part 6d of the diaphragm spring 6, the increase in releasing load PL can be controlled earlier than the conventional embodiment of FIG. 13 as shown by FIG. 10. Therefore, the required treading force of clutch pedal can be reduced by a large margin.

(3) Since the outer peripheral edge 30a of the coned disc spring 30 is held between the stepped part 4b of the fulcrum land 4a and the outer peripheral edge of the diaphragm spring 6, the abnormal sound and vibration due to interference between coned disc spring 30 and diaphragm spring 6 is avoided during operation of clutch.

(4) Since the coned disc spring 30, having the deflection/load characteristic as shown by FIG. 9, is used, the decrease in wear allowance W1 can be avoided when the deflection produced during load change of the coned disc spring 30 from zero to zero is made equal to the wear allowance (W1 in FIG. 10) obtained without using the coned disc spring.

SEVENTH EMBODIMENT

Figure 11:
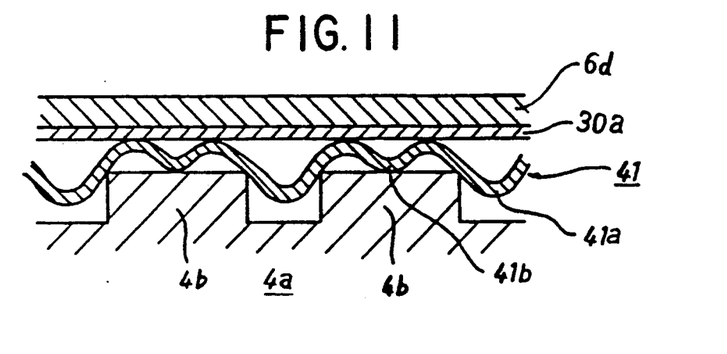
FIG. 11 is a vertical sectional view of an essential part shooing a clutch cover assembly of a seventh embodiment.

The structure of the part holding the outer peripheral edge 30a of the coned disc spring 30 in the sixth embodiment, may be that shown in FIG. FIG. 11 is a view corresponding to a sectional view taken along the line XI—XI of FIG. 8. In this figure, 41 is an annular disc-like leaf spring formed into a corrugated shape and disposed between the stepped part 4b of the fulcrum land 4a of annular pressure plate 4 and the outer peripheral edge 30a of the coned disc spring 30. The leaf spring 41 is composed of alternative large corrugations 41a and small corrugations 41b. The large corrugations 41b are so formed as to fit in slits 30c in the outer peripheral edge 30a of disc spring 30. According to this structure, the outer peripheral edge 30a is held more securely between the .stepped part 4b and the outer peripheral edge of the diaphragm spring 6, and the coned disc spring 30 is locked more securely in rotating direction.

What is claimed is:

1. A clutch cover assembly including an annular pressure plate movable in its axial direction for pressing the facings of a clutch disc on a flywheel, an annular clutch cover secured to said flywheel and covering an outer peripheral part of said pressure plate, an annular diaphragm spring having an outer peripheral portion in contact with a fulcrum land on said pressure plate for urging said pressure plate toward said clutch disc, a pair of wire rings clamped by plural approximately L-shaped bent tabs of said clutch cover which project integrally from an inner peripheral edge of said clutch cover axially in the direction toward said clutch disc with spaces between said bent tabs in the circumferential direction of said assembly and with the tip end of each said tab bent radially outward to hold a radial intermediate portion of said diaphragm spring, and having a releasing device pressing an inner peripheral portion of said diaphragm spring toward said clutch disc so as to apply a releasing force to said diaphragm spring for disengaging said clutch; characterized by that an annular coned disc spring urging an outer peripheral portion of said diaphragm spring toward a side of said diaphragm spring opposite to said clutch disc is disposed between said pressure plate and said diaphragm spring and an annular support plate having an inner peripheral part held between said bent tabs of said clutch cover and said pair of wire rings, said coned disc spring being held by an outer peripheral portion of said support plate said outer peripheral portion of the diaphragm spring being in an elastically deflected condition.

2. A clutch cover assembly as set forth in claim 1, in which an annular corrugated spring is disposed between an outer peripheral portion of said coned disc spring and a stepped portion formed at a radial inside of said fulcrum land, and wave tops of said corrugated spring are fitted in plural slits on said outer peripheral portion of said coned disc spring in radial directions on said coned disc spring.

3. A clutch cover assembly as set forth in claim 1 or claim 2, in which said bent tabs are passed through plural holes formed on said support plate in circumferential direction of said support plate.

4. A clutch cover assembly including an annular pressure plate movable in its axial direction of said cover assembly for pressing facings of a clutch disc between said pressure plate and a flywheel, an annular clutch cover secured to said flywheel and covering an outer peripheral portion of said pressure plate, an annular diaphragm spring having an outer peripheral portion in contact with a fulcrum land on said pressure plate for urging said pressure plate toward said clutch disc, a pair of wire rings clamped by approximately L-shaped plural bent tabs projecting integrally from an inner peripheral edge of said clutch cover axially in the direction toward said clutch disc with spaces between said bent tabs in the circumferential direction of said cover with tip ends of said tabs bent toward radial outside of said clutch assembly for holding radial intermediate portions of said diaphragm spring, and having a releasing device pressing an inner peripheral part of said diaphragm spring toward said clutch disc so as to apply an urging force to said diaphragm spring in a direction toward disengaging said clutch; characterized by that an annular coned disc spring for urging the outer peripheral part of said diaphragm spring toward a side opposite to said clutch disc is disposed between said pressure plate and said diaphragm spring, an annular support plate having an inner peripheral part is held between said diaphragm spring and a clutch disc side wire ring among a pair of said wire rings in said bent tabs, and said coned disc spring is held by an outer peripheral part of said support plate and the outer peripheral part of said diaphragm spring in an elastically deflected condition.

5. A clutch cover assembly as set forth in claim 4, in which an annular corrugated spring is disposed between an outer peripheral portion of said coned disc spring and a stepped portion formed at a radial inside of said fulcrum land, and wave tops of said corrugations of said corrugated spring being fitted in plural slits in a radial direction on the outer peripheral portion of said coned disc spring.

6. A clutch cover assembly as set forth in claim 4 or claim 5, in which said bent tabs pass through plural holes formed in a circumferential direction on said support plate.

7. A clutch cover assembly including an annular pressure plate movable in its axial direction of said assembly for pressing facings of a clutch disc between said pressure plate and a flywheel, an annular clutch cover secured to said flywheel and covering an outer peripheral part of said pressure plate, an annular diaphragm spring having an outer peripheral part in contact with a fulcrum land of said pressure plate for urging said pressure plate toward said clutch disc, a pair of wire rings clamped by approximately L-shaped plural bent tabs projecting integrally from an inner peripheral edge of said clutch cover axially in a direction toward said clutch disc with appropriate spaces left between said tabs in the circumferential direction of said clutch with tip ends bent toward the radial outside of said cover so as to hold a radial intermediate portion of said diaphragm spring, and having a releasing device pressing an inner peripheral part of said diaphragm spring toward said clutch disc for applying an urging force to said diaphragm spring for disengaging said clutch; characterized by that an annular coned disc spring for urging said outer peripheral part of said diaphragm spring to a side opposite to said clutch disc is disposed between said pressure plate and said diaphragm spring, an annular support plate having an inner peripheral part secured by welding to a wire ring of said pair of wire rings and disposed at the clutch disc side of said diaphragm spring, said coned disc spring being held by an outer peripheral part of said diaphragm spring in an elastically deflected condition.

8. A clutch cover assembly as set forth in claim 7, in which an annular corrugated spring is disposed between an outer peripheral part of said coned disc spring and a stepped part formed at a radial inside of said fulcrum land, and wave tops of said corrugated spring are fitted in plural slits made on an outer peripheral part of said coned disc spring in radial direction of said coned disc spring.

9. A clutch cover assembly including an annular pressure plate movable in its axial direction for pressing facings of a clutch disc on a flywheel, an annular clutch cover secured to said flywheel and covering an outer periphery of said pressure plate, an annular diaphragm spring, an outer peripheral portion of which contacts with a fulcrum land of said pressure plate to urge said pressure plate toward said clutch disc, a pair of wire rings clamped by approximately L-shaped plural bent tabs projecting integrally from an inner peripheral edge of said clutch cover axially in the direction toward said clutch disc with spaces therebetween in a circumferential direction of said clutch cover with tip ends of said tabs bent radially outward and holding a radial intermediate portion of said diaphragm spring, and having a releasing device pressing an inner peripheral portion of said diaphragm spring toward said clutch disc for releasing an urging force of said diaphragm spring for disengaging said clutch; characterized by that an annular coned disc spring for urging the outer peripheral portion of said diaphragm spring toward a side opposite to said clutch disc is disposed between said pressure plate and said diaphragm spring with plural tongue-like pieces projecting integrally from an inner peripheral edge of said coned disc spring radially inward with circumferential spaces therebetween, a clutch disc side wire ring among a pair of wire rings, bent toward said clutch disc at plural spots to form plural concave portions, said tongue-like pieces of said coned disc spring being fitted in said concave portions and supporting said coned disc spring in an elastically deflected condition.

10. A clutch cover assembly including an annular pressure plate movable in its axial direction for pressing facings of a clutch disc between said pressure plate and a flywheel, an annular clutch cover secured to said flywheel and covering an outer peripheral part of said pressure plate, an annular diaphragm spring having an outer peripheral part for contact with a fulcrum land of said pressure plate to urge said pressure plate toward said clutch disc, a pair of wire rings clamped by stud pins projecting from an inner peripheral edge of said clutch cover axially in the direction toward said clutch disc with spaces in the circumferential direction therebetween so as to hold a radial intermediate portion of said diaphragm spring, and having such a structure that a releasing device presses an inner peripheral part of said diaphragm spring toward said clutch disc so as to release an urging force of said diaphragm spring to disengage said clutch; characterized by that an annular coned disc spring urging the outer peripheral part of said diaphragm spring to a side opposite to said clutch disc is disposed between said pressure plate and said diaphragm spring, an annular support plate, an inner peripheral part of which has plural holes made in circumferential direction and fitted with tip ends of said stud pins and contacts with a clutch disc side wire ring among said pair of wire rings to be secured to said stud pins, and said coned disc spring is held by an outer peripheral part of said support plate and the outer peripheral part of said diaphragm spring in an elastically deflected condition.

11. A clutch cover assembly as set forth in claim 10, in which said coned disc spring has a characteristic that its load gradually increases from zero and further decreases to zero again with an increase in a deflection.

12. A clutch cover assembly as set forth in claim 10 or claim 11, in which an outer peripheral part of said coned disc spring is pressed on said diaphragm spring by an annular corrugated spring disposed at a stepped part formed on a radial inside of said fulcrum land.

13. A clutch cover assembly as set forth in claim 12, in which tops of said annular corrugated spring are fitted in between adjoining fulcrum lands.

* * * * *